United States Patent
Murphy et al.

(10) Patent No.: US 10,324,542 B2
(45) Date of Patent: Jun. 18, 2019

(54) ELASTOMERIC PEN TIP

(71) Applicant: Microsoft Technology Licensing, LLC, Redmond, WA (US)

(72) Inventors: Luke M. Murphy, North Bend, WA (US); Bradley Edgar Clements, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 15/241,497

(22) Filed: Aug. 19, 2016

(65) Prior Publication Data

US 2018/0052533 A1 Feb. 22, 2018

(51) Int. Cl.
*G06F 3/0354* (2013.01)
*G06F 3/041* (2006.01)

(52) U.S. Cl.
CPC .......... *G06F 3/03545* (2013.01); *G06F 3/041* (2013.01); *G06F 2203/04106* (2013.01)

(58) Field of Classification Search
CPC ................. G06F 3/03545; G06F 3/041; G06F 2203/04106
See application file for complete search history.

(56) References Cited

U.S. PATENT DOCUMENTS

| | | | |
|---|---|---|---|
| 4,115,015 A | 9/1978 | Torii | |
| 5,877,459 A | 3/1999 | Prater | |
| 6,664,953 B2 | 12/2003 | Quek | |
| 6,720,957 B1 * | 4/2004 | Chen | G06F 3/03545 178/19.01 |
| 8,847,930 B2 | 9/2014 | Boyd et al. | |
| 2006/0127163 A1 | 6/2006 | Rahn et al. | |
| 2006/0232570 A1 | 10/2006 | Yuen et al. | |
| 2007/0077111 A1 * | 4/2007 | Qiu | B29C 45/1676 401/6 |
| 2013/0321355 A1 | 12/2013 | Teiblum | |
| 2014/0055425 A1 | 2/2014 | Li et al. | |
| 2014/0111488 A1 * | 4/2014 | Michihata | G06F 3/03545 345/179 |
| 2014/0347327 A1 * | 11/2014 | Wu | G06F 3/039 345/179 |
| 2015/0131835 A1 * | 5/2015 | Huang | H04R 1/028 381/338 |
| 2015/0306899 A1 | 10/2015 | Li | |

(Continued)

FOREIGN PATENT DOCUMENTS

| | | |
|---|---|---|
| CN | 201376409 Y | 1/2010 |
| WO | 2005105479 A2 | 11/2005 |

OTHER PUBLICATIONS

"International Search Report and Written Opinion Issued in PCT Application No. PCT/US2017/047245", dated Oct. 4, 2017, 12 Pages.

(Continued)

*Primary Examiner* — Andrew Sasinowski
(74) *Attorney, Agent, or Firm* — Holzer Patel Drennan (57) ABSTRACT

The described technology includes a digital pen tip with a pen tip body and an elastomeric front end formed at a front end of the pen tip body, wherein the pen tip body is formed during a first stage of a two shot molding process and the front end is formed at a second stage of the two shot molding process.

20 Claims, 6 Drawing Sheets

(56) References Cited

U.S. PATENT DOCUMENTS

2016/0018911 A1    1/2016    Lan et al.

OTHER PUBLICATIONS

Xie, et al., "Polymer Pen Lithography Using Dual-Elastomer Tip Arrays", In Journal of Small, vol. 18, No. 10, Sep. 10, 2012, 2 pages.
Hedrick, et al., "Hard Transparent Arrays for Polymer Pen Lithography", In Journal of ACS Nano, vol. 10, Issue 3, Mar. 1, 2016, 2 pages.

* cited by examiner

ELASTOMERIC PEN TIP

BACKGROUND

Electronic devices such as tablets, smartphones, laptop computers, may receive input via a digital pen, such as a stylus pen. Digital pens may include extruded conductive plastic sleeve with a core. The core of the such digital pens may crack due to high stress from use. Furthermore, the conductive plastic sleeve may crack when dropped.

SUMMARY

The described technology includes a digital pen tip with a pen tip body and an elastomeric front end formed at a front end of the pen tip body, wherein the pen tip body is formed during a first stage of a two shot molding process and the front end is formed at a second stage of the two shot molding process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

A digital pen tip disclosed herein includes a front end formed within a pen tip body. The pen tip body may be made of plastic or some other rigid material. The front end may be made of elastomeric material. In one implementation, the digital pen tip is formed using two shot molding process. Specifically, the two shot molding process may include forming the pen tip body at a first of the dual shot molding process and forming the front end during a second stage of the dual shot molding process.

Figure 1:
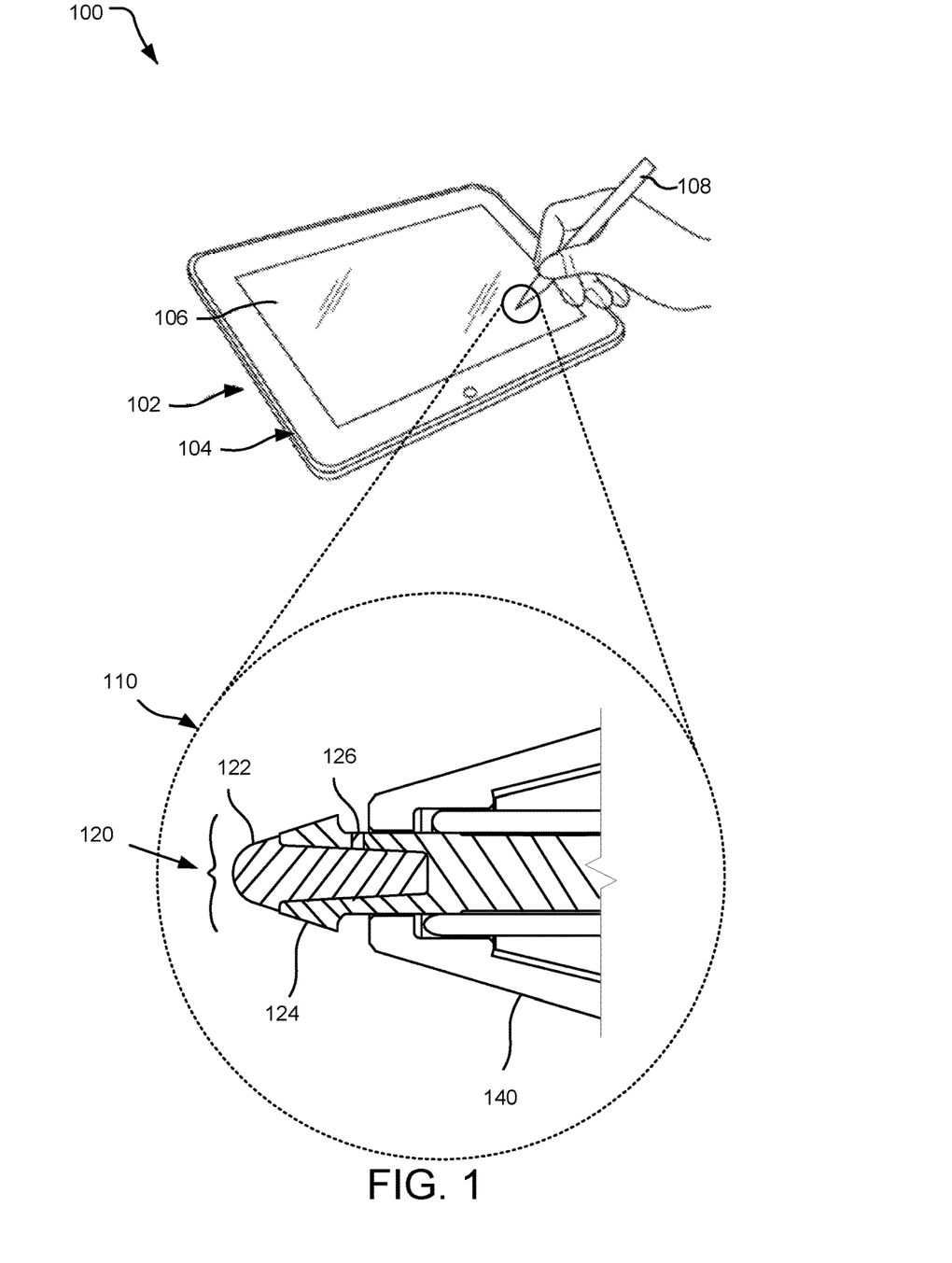
FIG. 1 illustrates an example electronic device using the pen tip disclosed herein.

FIG. 1 discloses an electronic device 102 using the digital pen tip disclosed herein. For example, the electronic device 102 is a portable electronic device into which input can be provided by handwriting with a pen or a finger. The electronic device 102 can be implemented as a tablet computer, a notebook type personal computer, a smartphone, a PDA, etc. As shown in FIG. 1, the electronic device 102 has a body 104, and a touch screen display 106. The touch screen display 106 is attached so as to be laid on an upper surface of the body 104.

The touch screen display 106 may include a flat panel display and sensors configured to detect a touch position of a pen 108 or a finger on a screen of the flat panel display. For example, the flat panel display may be a liquid crystal display device (LCD) and the sensor may be a capacitance type touch panel or an electromagnetic induction type digitizer. Assume now that a digitizer and a touch panel which are two kinds of sensors are incorporated in the touch screen display 106.

Each of the digitizer and the touch panel is provided to cover the screen of the flat panel display. The touch screen display 106 can detect not only a touch operation using a finger on the screen but also a touch operation using the pen 108 on the screen. For example, the pen 108 may be an electromagnetic induction pen. A user can perform a handwriting input operation on the touch screen display 17 by using an external object (the pen 108 or a finger).

The pen 108 may be a digital pen that includes a pen tip disclosed herein. An expanded view 110 of the digital pen shows a partial view of a pen tip 120 (shaded portion) housed within a pen tip holder 140. The pen tip 120 includes a front end 122 and a body 124. The front end 122 may be made of an elastomeric material. The elastomeric material used to form the elastomeric front end 122 may be one of thermoplastic elastomers and resins having high friction values, as the high friction coefficient material for the pen core of the stylus pen. For example, the thermoplastic elastomers include styrene-butadiene-styrene block copolymer (SBS), styrene-isoprene-styrene block copolymer (SIS), styrene-ethylene/butylene-styrene block copolymer (SEBS), styrene-ethylene/propylene-styrene block copolymer (SEPS), polyolefin-based thermoplastic elastomer, natural rubber (NR), isoprene rubber (IR), butadiene rubber (BR), styrene-butadiene rubber (SBR), chloroprene rubber (CR), nitrile rubber (NBR), butyl rubber (IIR), acrylic rubber (ACM), silicone rubber. Each of these thermoplastic elastomers may be used singly or a mixture of two or more kinds of these thermoplastic elastomers may be used. These thermoplastic elastomers may be mixed with the resins.

The body 124 of the pen tip 120 may be made of plastic or other rigid material. In one implementation, the body 124 is made of plastic that is filled with carbon fiber. The front end 122 has a spherical shape at its front. At least part of the front end 122 is housed within a cavity of the body 124. The pen tip 120 may be made by a two shot molding process where at the first stage the body 124 is injection molded. Specifically, at the first stage the body 124 is injection molded with desired features in a first plastic mold, wherein one of the features is a small internal cavity with a side hole required for second shot of the injection molding. In the implementation illustrated in FIG. 1, the cavity is shown as filled with the front end 122 and the side hole 126 is also filled with the same material as the material of the front end 122, such as elastomeric material.

Figure 2:
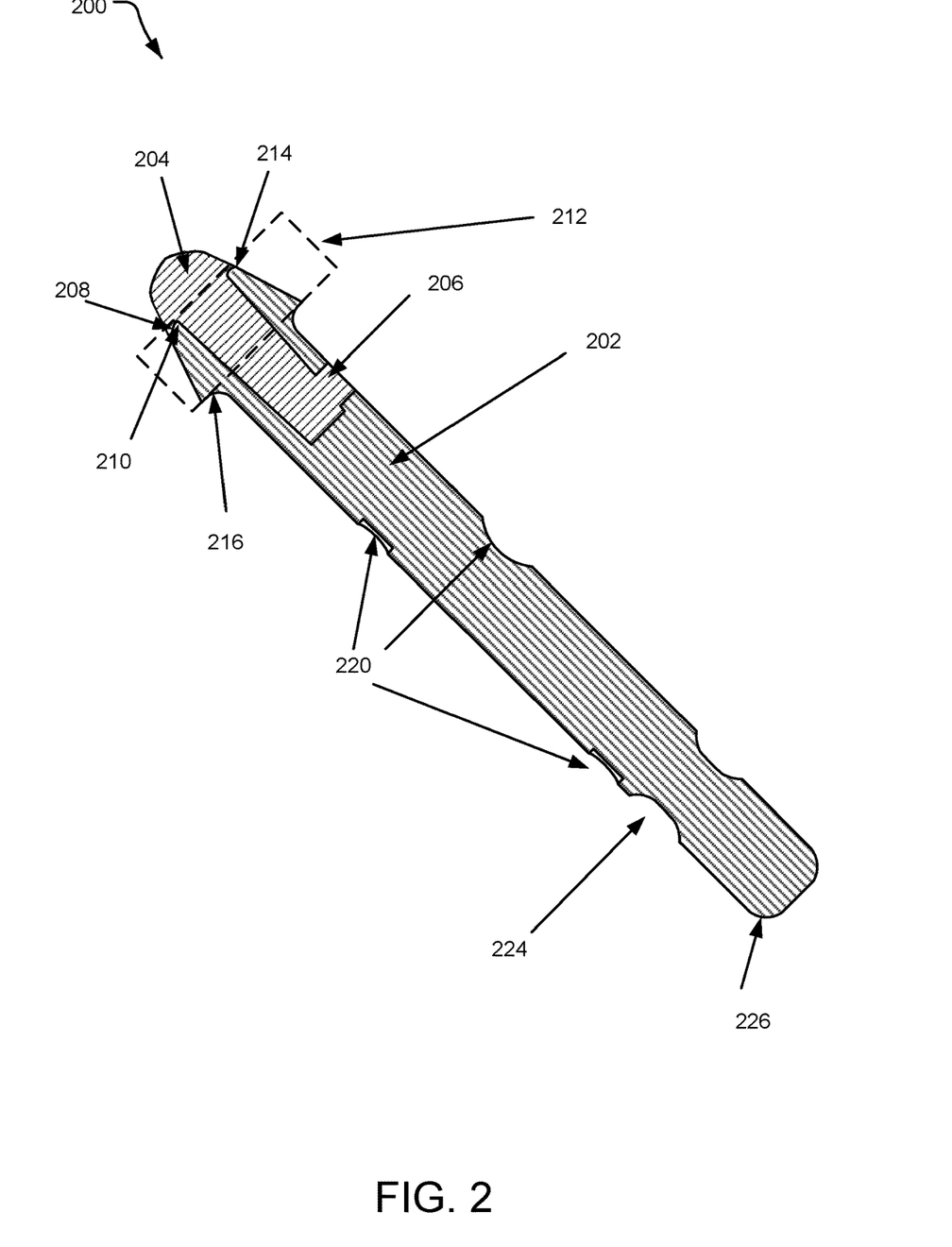
FIG. 2 illustrates an example pen tip formed according to the technology disclosed herein.

FIG. 2 illustrates a pen tip 200. The pen tip 200 is shown to include a body 202 and a front end 204. The body 202 may be made of plastic material, such as a rigid plastic material, plastic material reinforced with carbon fibers. The front end 204 may be made of elastomeric material. The front surface of the front end 204 may be of substantially spherical shape. The front surface of the front end 204 may have a circular lip 208 that is adjacent to a circular rim 210 of the body 202. As shown in the implementation, at least part of the front end 204 is formed inside a cavity within the body 202. In one implementation, such cavity has tapered width along the length of the pen tip. Thus, such cavity has higher cross-sectional diameter at its end towards the front spherical surface compared to its cross-sectional diameter at its back end inside the body 202.

The front end 204 is connected to a side hole 206 that has an opening on the outer surface of the body 202. In an implementation, the body 202 has a conical section 212 surrounding at least part of the front end 204. Such conical section 212 substantially begins at the lip 208 and ends at a trough 216. Specifically, the diameter of the conical section 212 is higher near the trough 216 compared to the diameter of the conical section 212 near the lip 208. Such conical section 212 provides aesthetics as well as increased support to the front end 202 from breakage.

The front end 204 may be made at a second stage of a two shot injection molding process where the material forming the front end 204, such as elastomeric material, may be injected into a cavity within the body 202 through a side hole 206. In such a case, the body 202 is formed at a first stage of such two shot injection molding process. Specifically, during the first stage of the two shot injection molding process, the body 202 is formed with the side hole 206 and a cavity where the front end 204 is formed. Subsequently, the material for the front end 204 is injected via the side hole 206. Because both the body 202 and the front end 204 of the pen tip 200 are formed using two stages of the two shot injection molding process where the body 202 works as a mold for the front end 204, the outer surface of the front end 204 that is adjacent to the inner surface of the body 202 are in conformity with each other, thus providing higher level of fit between them. One additional advantage is that the tip is stiffer, which feels better to a user. Also, elevated temperatures from the molding process improves bonding between the outcomes of the first and second shot.

The body 202 also includes one or more grooves 220 on its outer surface. For example, such groves 220 are illustrated as being circular in the illustrated implementation. However, in alternative implementations, the grooves 220 may have an alternative shape. Note that each of the 220, 312 and 416 (in FIGS. 2, 3, and 4, respectively) are gate and ejector pin artifacts of the molding process. Furthermore, the body 202 also has an annular or ring-shaped groove 224 closer to the rear end of the body 202. The annular groove 224 may provide a recess to latch the pen tip 200 into a pen tip holder (such as the pen tip holder 140 disclosed in FIG. 1). The tail end may have curved edges 226. Such curved edge 226 facilitates insertion of the pen tip 200 into the pen tip holder (not shown). Furthermore, the body 202 also has alignment ribs (not shown) on its outer surface, wherein the alignment ribs (not shown) increases the stability of the pen tip when inserted in the pen tip holder (not shown).

Figure 3:
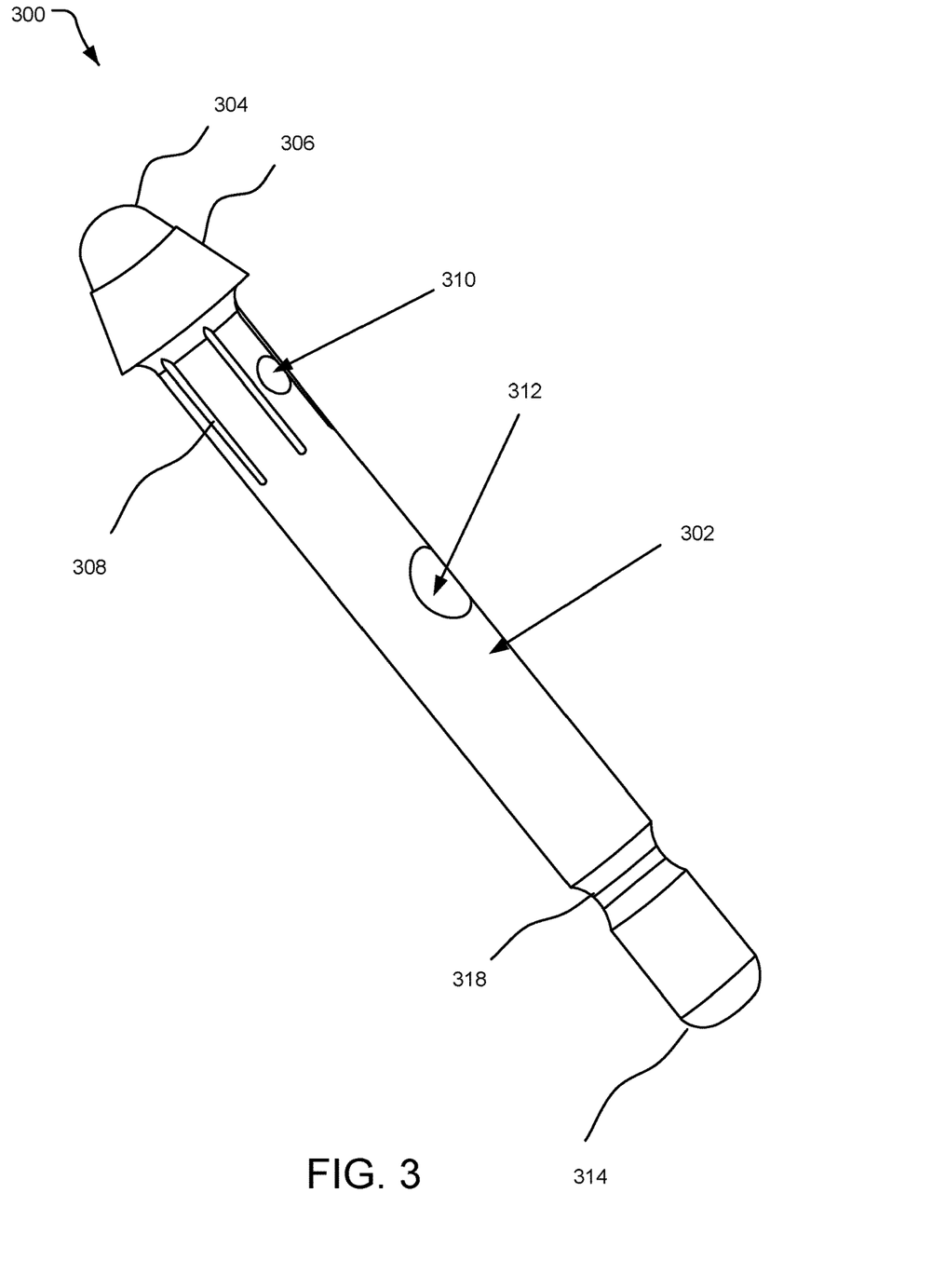
FIG. 3 illustrates a three dimensional view of an example pen tip.

FIG. 3 illustrates a three dimensional view of a pen tip 300. The pen tip 300 includes a body 302 and a front end 304. The body 302 includes a conical section 306 adjacent to the front end 304. Specifically, the conical section 306 that has a higher diameter near the back end of the conical section 306 compared to its diameter at the front that is adjacent to the front end 304. The front end 304 has a spherical front surface that comes in touch with a touch screen display of an electronic device, such as a tablet, smart phone, laptop. While not shown in FIG. 3, the front end 304 has at least part thereof inside a cavity within the body 302, resulting in higher stability.

The pen tip 300 may be formed using a two shot injection molding process. Specifically, the body 302 is formed at a first stage of the two shot injection molding process and the front end 304 is formed at a second stage of the two shot injection molding process.

The body 302 has a number of alignment ribs 308 along its outer surface. The alignment ribs 308 are provided so as to allow the pen tip 300 to fit securely in a pen tip holder (not shown). Specifically, the alignment ribs 308 fits into the pen tip holder such that the wobbling of the pen tip 300 is reduced during its use. In the illustrated implementation, such alignment ribs are shown to span from the front of the body 302 near the conical section 306 to about a third way along the length of the body 302. However, in an alternative implementation, the alignment ribs 308 may span even further along the length of the body 302.

In one implementation, the alignment ribs 308 may be used to integrate the pen tip 300 with inside diameter of a pen tip holder (such as the pen tip holder 140 disclosed in FIG. 1) to make electrical contact at the front end of the pen tip 300. Such electrical contact at the front end reduces the resistance between the pen tip 300 and the pen tip holder to improve the electrical performance. The reduced resistance results in higher levels of electrical signal being passed to the front end 304 from a power source (not shown) that may be located within the digital pen. The pen tip 300 may be charged with AC voltage by such a power source.

Sensors embedded within a touch screen display (such as the touch screen display 106 disclosed in FIG. 1) may detect an electrical field near the touch screen display to sense a location of the pen tip 300 on the touch screen display. For example, the touch screen display may have a grid of conductive lines that couple electromagnetically with the pen tip 300 charged with AC voltage. The reduced resistance resulting from the integration of the alignment ribs 308 with a pen tip holder (such as the pen tip holder 140 disclosed in FIG. 1) results in the pen tip 300 being charged with more AC charge and thus it generates higher level of electrical field that may be detected by the conductive lines of the touch screen display.

The outer surface of the body 302 also shows an opening 310 of a side hole (not shown) in the body 302, where the side hole is used to fill in the material for the front end 304, such as elastomer material, during a second stage of a two shot injection molding process. The body 302 also includes various grooves 312 that provides a better grip when inserting the pen tip 300 into a pen tip holder (not shown). The body 302 also includes an annular groove 318 that provides a recess to latch the pen tip 400 in the pen tip holder (such as the pent tip holder 140 disclosed in FIG. 1). The tail end of the body 302 has radial edge 314, which allows to lead the pen tip 300 into the pen tip holder. The curved tail end of the body 302 also allows the tip to be more easily inserted into a tip holder. Furthermore, it also helps expand clamps (not shown) that make the electrical contact to the tip.

Figure 4:
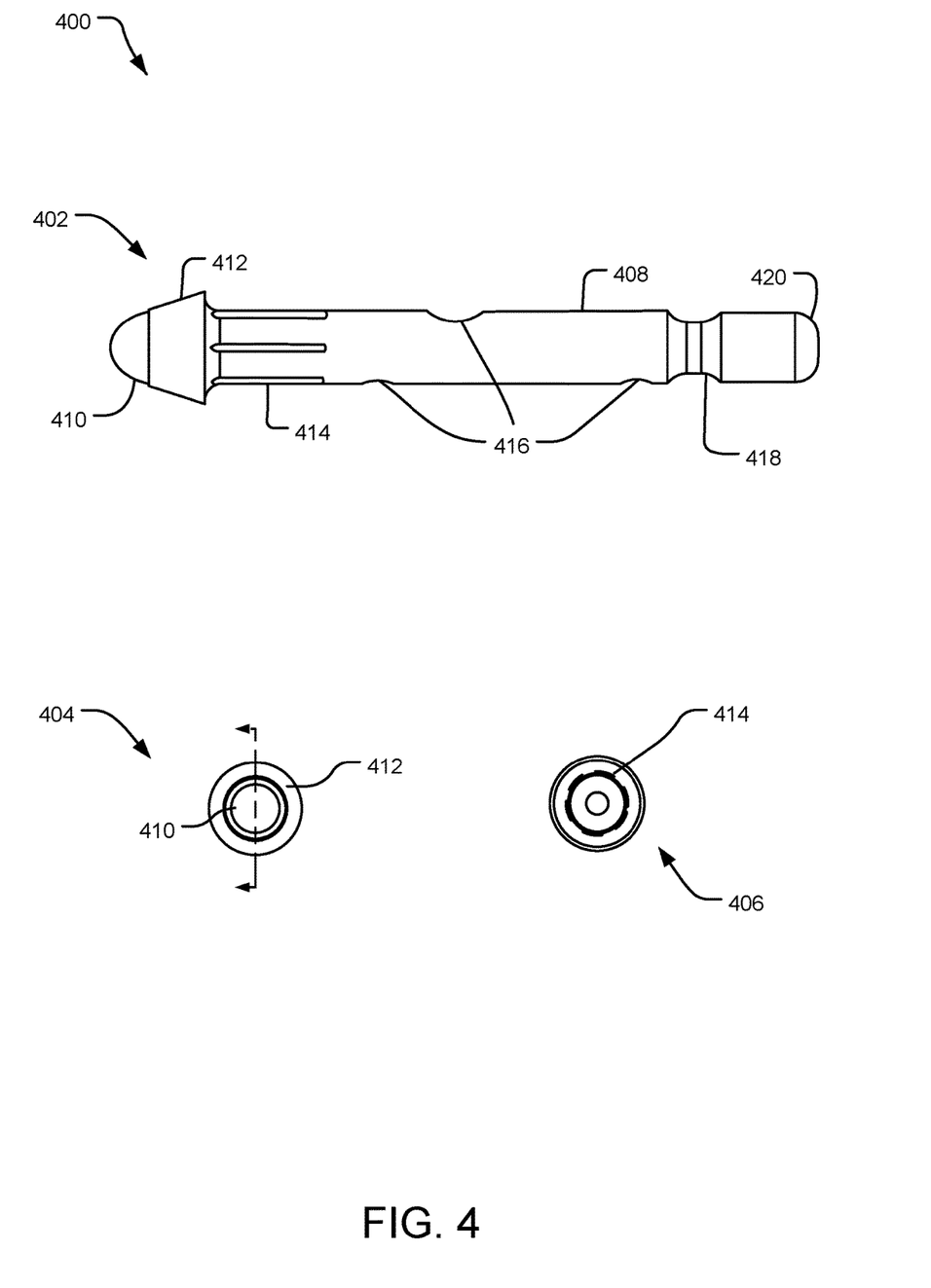
FIG. 4 illustrates various views of an example pen tip, including a side view, a front end view, and a rear end view.

FIG. 4 illustrates various views of a pen tip 400, including a side view 402, a front end view 404, and a rear end view 406. Specifically, the side view 402 of the pen tip 400 illustrates body 408 and a front end 410, wherein the body 408 may be formed during a first stage of a two shot injection molding process and the front end 410 may be formed during a second stage of the two shot injection molding process. For example, the first stage of the injection molding process may involve injecting material, such as melted plastic, to form the body 408. The body 408 is formed to include a cavity in the shape of the front end 410 and a side hole (not shown) through which material forming the front end 410, such as elastomer, is injected into the body 408.

The body 408 includes a conical section 412 adjacent to the front end 410. A number of alignment ribs 414 are provided on the outer surface of the body 408, wherein such alignment ribs reduce the wobble and play of the pen tip 400 inside a pen tip holder (not shown). An annular groove 418 provides a recess to latch the pen tip 400 in the pen tip holder and various grooves 416 facilitates inserting the pen tip 400 into the pen tip holder. A curved edge 420 at the tail end of the body 408 aids with insertion of the pen tip 400 into the pen tip holder.

Figure 5:
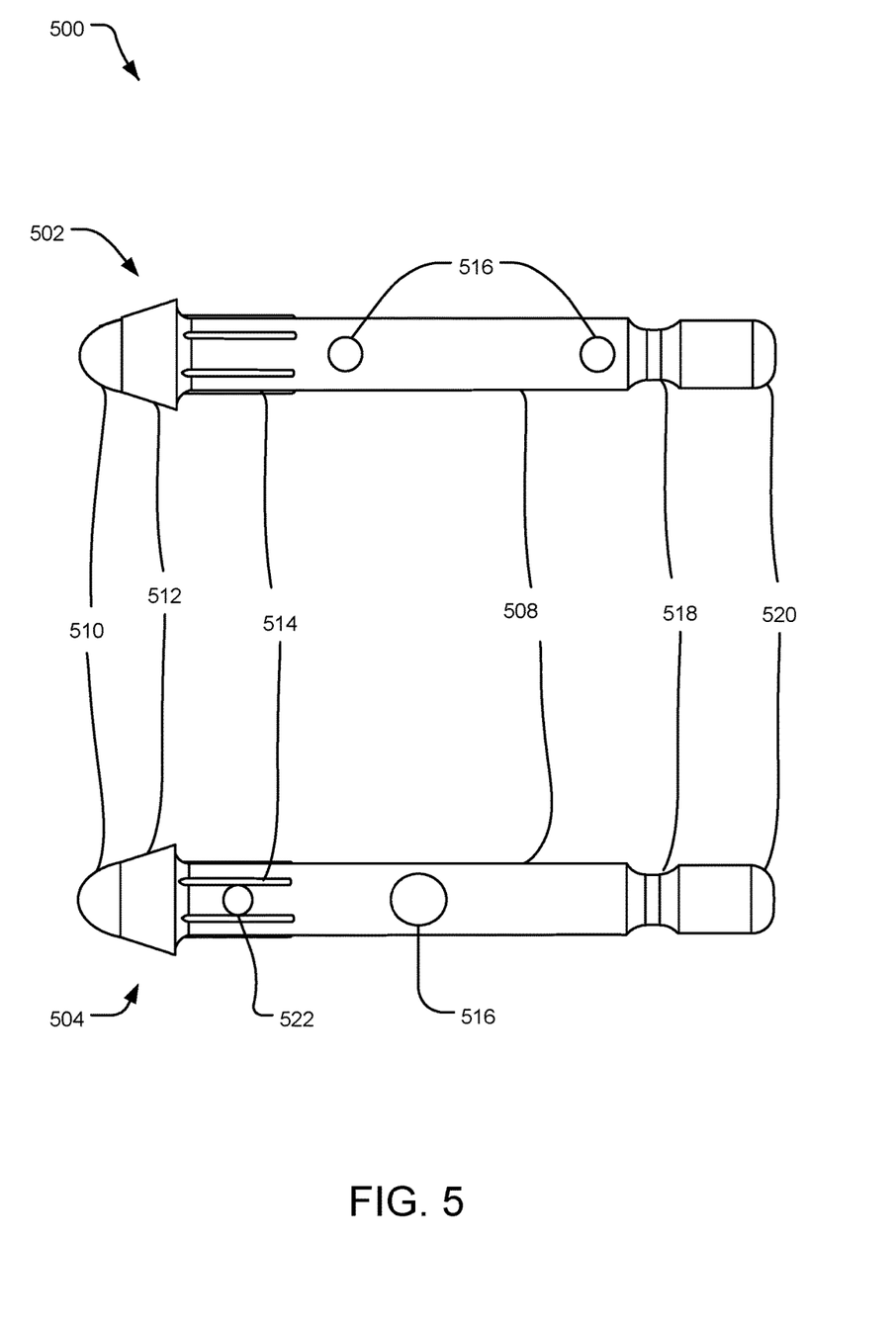
FIG. 5 illustrates various alternative views of an example pen tip including a top view and a bottom view.

FIG. 5 illustrates various alternative views of a pen tip 500 including a top view 502 and a bottom view 504. Specifically, the pen tip 500 includes a body 508 and a front end 510. The body 508 includes a conical section 512, various alignment ribs 514, various groove 516, an annular groove 518, and a curved end 520. The bottom view 504 also illustrates an outer end of a side hole 522, wherein such side hole 522 may be used to inject material for the front end 510 into a cavity of the body 508 during a second stage of a two shot injection molding process.

Figure 6:
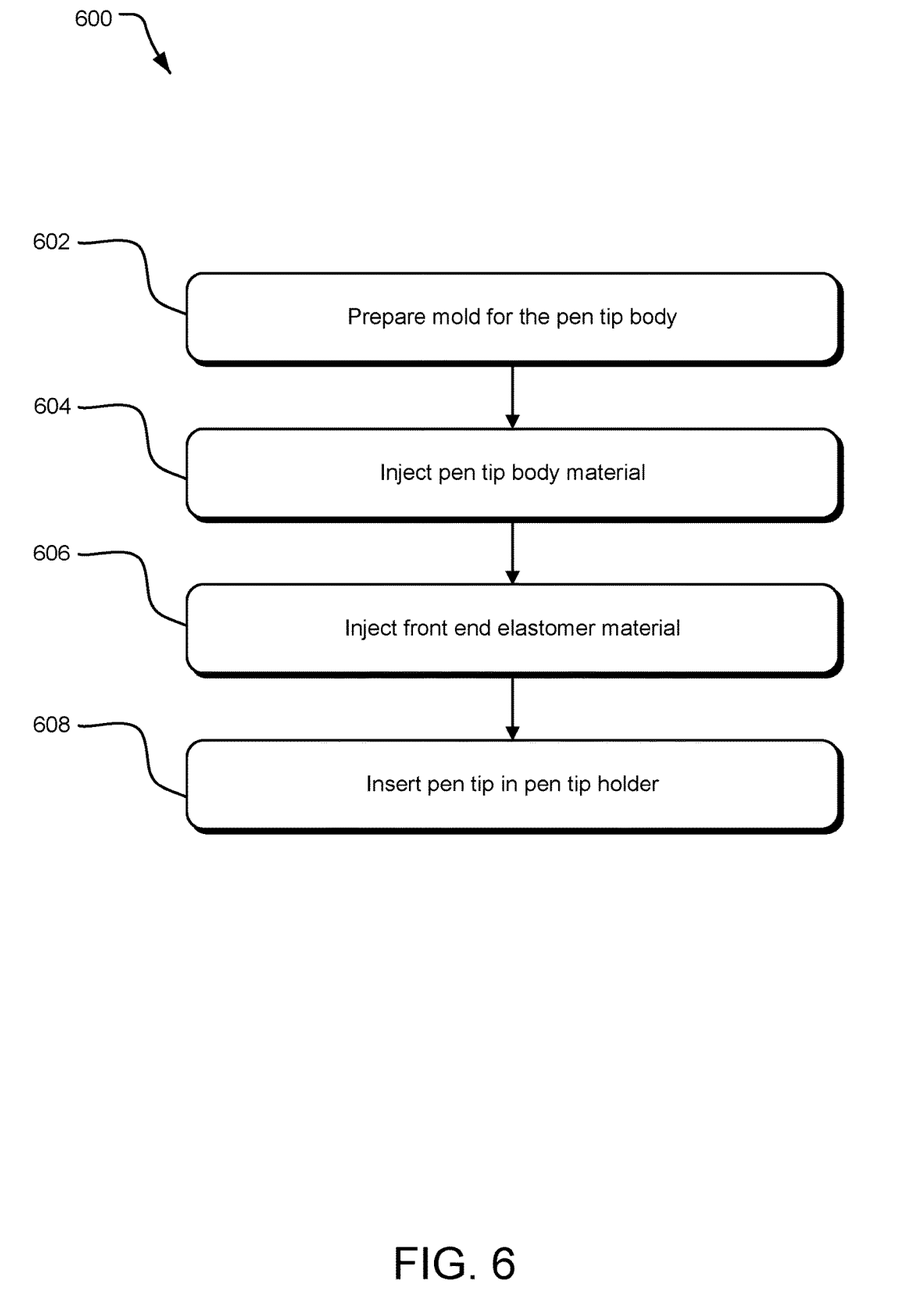
FIG. 6 illustrates example operations for forming a pen tip.

FIG. 6 illustrates operations 600 for forming a pen tip. Specifically, the operations 600 provide for forming a pen tip using two shot molding process. An operation 602 prepares the mold for the body of the pen tip for injection molding. The mold for the pen tip body may also be designed to give various features of the body, such as alignment ribs, circular grooves, annular grooves, radial tail end. An operation 604 the mold for a body of a pen tip is injected with the material forming the body. For example, the mold for the pen tip body may be injected with melted plastic to form the body with a cavity and a side hole therein. At the end of the operation 604, the pen tip body with the various features is produced. One of these features is a cavity to form a front end of the pen tip.

An operation 606 injects the material for the front end of the pen tip into the cavity of the body. For example, elastomeric material may be injected into the cavity via the side hole in the body. Because there is no human touch between the first stage of the injection molding for the pen tip body and the second stage for the front end, the material from the second stage conforms with the outlines of the body resulting from the first stage, thus providing better fit between the front end elastomeric material and the plastic material of the pen tip body.

An operation 608 may include inserting the pen tip into a pen tip holder to provide a usable digital pen that may be used with electronic devices, such as tablets, smart phones.

A digital pen tip disclosed herein includes a pen tip body and an elastomeric front end formed at a front end of the pen tip body. In one implementation of the digital pen tip, the pen tip body is formed during a first stage of the two-shot molding process. In an alternative implementation, the elastomeric front end is formed during a second stage of a two-shot molding process. In yet another alternative implementation, the pen tip body includes an internal cavity connected to a hole on a side of the pen tip body. In an alternative implementation, the elastomeric front end is formed within the internal cavity. In another alternative implementation, a front end of the internal cavity along a front rim has higher diameter compared to the back end of the internal cavity.

In an alternative implementation, the elastomeric front end further comprises a circular lip adjacent to a front rim of the pen tip body. In yet another alternative implementation, the pen tip body further comprises ribs along an outer surface of the pen tip body. Yet alternatively, the pen tip body further comprises annular grooves on an outer surface of the pen tip body. In another alternative implementation, the elastomeric front end has spherical shape. In one alternative implementation, the front end of the pen tip body comprises a conical section with a front edge adjacent to a front rim having smaller diameter compared to diameter of a back edge adjacent to a back trough. Alternatively, the pen tip body further comprises a tail end with radial end surface.

A method of making a digital pen tip, includes forming pen tip body of the digital pen tip during a first stage of a dual shot molding process and forming a front end of the digital pen tip during a second stage of a dual shot molding process. In an alternative implementation, forming the pen tip body further comprises forming the pen tip body with an internal cavity. In another alternative implementation, forming the pen tip body further comprises forming the pen tip body with an internal cavity with a side hole required for a second shot to form the front end. In an alternative implementation, forming the front end further comprises injecting elastomeric material during the second stage of the dual shot molding process. In an alternative implementation, forming the pen tip body further comprises injecting plastic material during the first stage of the dual shot molding process.

An apparatus disclosed herein includes a digital pen tip comprising an elastomeric front end, a pen tip body comprising a plurality of ribs along an outer surface of the pen tip body, and a digital pen tip holder with contact cavities configured to align with the ribs along the outer surface of the pen tip body. In an alternative implementation of the apparatus, at least part of the elastomeric front end is within a cavity of a pen tip body. In another alternative implementation, the pen tip body is made of plastic.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A digital pen tip comprising:
   a pen tip body;
   an elastomeric front end formed at a front end of the pen tip body; wherein the pen tip body further comprises alignment ribs that integrates with an inner surface of a pen tip holder to provide electrical contact between the digital pen tip and the pen tip holder.

2. The digital pen tip of claim 1, wherein the pen tip body is formed during a first stage of the two-shot molding process.

3. The digital pen tip of claim 1, wherein the elastomeric front end is formed during a second stage of a two-shot molding process.

4. The digital pen tip of claim 1, wherein the pen tip body includes an internal cavity connected to a hole on a side of the pen tip body.

5. The digital pen tip of claim 4, wherein the elastomeric front end is formed within the internal cavity.

6. The digital pen tip of claim 5, wherein the pen tip body further comprises annular grooves on the outer surface of the pen tip body.

7. The digital pen tip of claim 4, wherein a front end of the internal cavity along a front rim has higher diameter compared to the back end of the internal cavity.

8. The digital pen tip of claim 1, wherein the elastomeric front end further comprises a circular lip adjacent to a front rim of the pen tip body.

9. The digital pen tip of claim 1, wherein the alignment ribs are along an outer surface of the pen tip body.

10. The digital pen tip of claim 1, wherein the elastomeric front end has spherical shape.

11. The digital pen tip of claim 1, wherein the front end of the pen tip body comprises a conical section with a front edge adjacent to a front rim having smaller diameter compared to diameter of a back edge adjacent to a back trough.

12. The digital pen tip of claim 1, wherein the pen tip body further comprises a tail end with radial end surface.

13. A method of making a digital pen tip, the method comprising:
    forming pen tip body of the digital pen tip during a first stage of a dual shot molding process, wherein forming the pen tip body further comprises forming the pen tip body with a side hole along a side surface of the pen tip body and alignment ribs that integrates with an inner surface of a pen tip holder to provide electrical contact between the digital pen tip and the pen tip holder; and
    forming a front end of the digital pen tip during a second stage of a dual shot molding process.

14. The method of claim 13, wherein forming the pen tip body further comprises forming the pen tip body with an internal cavity.

15. The method of claim 14, wherein forming the pen tip body further comprises forming the pen tip body with the internal cavity connected with the side hole.

16. The method of claim 14, wherein forming the front end further comprises injecting elastomeric material during the second stage of the dual shot molding process.

17. The method of claim 14, wherein forming the pen tip body further comprises injecting plastic material during the first stage of the dual shot molding process.

18. An apparatus, comprising:
    a digital pen tip comprising an elastomeric front end;
    a pen tip body comprising a plurality of ribs along an outer surface of the pen tip body, wherein the ribs integrates with an inner surface of a pen tip holder to provide electrical contact between the digital pen tip and the pen tip holder; and
    the pen tip holder with contact cavities configured to align with the ribs along the outer surface of the pen tip body.

19. The apparatus of claim 18, wherein at least part of the elastomeric front end is within a cavity of a pen tip body.

20. The apparatus of claim 18, wherein the pen tip body is made of plastic.

* * * * *